United States Patent Office 3,460,198
Patented Aug. 12, 1969

3,460,198
CONTAINER MOLDING, FILLING AND
SEALING APPARATUS
Thomas J. Dietz, Chester Heights, and William E.
Meissner, Devon, Pa., assignors to FMC Corporation,
Philadelphia, Pa., a corporation of Delaware
Filed Oct. 5, 1965, Ser. No. 493,117
Int. Cl. B29c 3/00; B65b 3/02
U.S. Cl. 18—5                                    8 Claims

ABSTRACT OF THE DISCLOSURE

Molding apparatus in which a confined portion of a tube of flowable film-forming material having a closed end is expanded within a mold cavity and then sealed and severed from the remainder of such tube to provide a container having walls which are generally smooth and of uniform thickness.

The present invention relates to an improved apparatus for molding hollow closed articles, and more particularly for molding, filling and completely closing plastic containers.

It is known in the art to form containers by expanding a tube of expandable plastic material within a desirably shaped mold, as by a liquid material which is to be packaged. Once formed and filled, such containers will generally be sealed and simultaneously cut off from the unexpanded portion of the tube of plastic material.

In apparatus for practicing the above-described operation, sealing and severing of the filled container is usually achieved by a pair of opposed knives which are located adjacent to and on opposing sides of the opening in the mold through which the tube of plastic material is first delivered. The edges of these knives are straight and parallel in order that they are capable of performing their intended cutting action. Thus during the expansion of such tube, plastic material is usually forced upwardly and outwardly through the mold opening and beyond at least portions of the knife edges.

This undesired flow of plastic material may mix with and perhaps contaminate the material which is being packaged when such material is used to expand the tube of plastic material. More important, this flow of plastic material through the mold opening provides the molded container with a nonuniform wall thickness, particularly in the areas adjacent to the mold opening at which container sealing is subsequently affected. Further, this escape of plastic material from within the mold may not be uniform around the mold opening since the cutting knives may offer at least some obstruction to its flow. As a result, the finished containers exhibit generally nonuniform and unreliable seals. In addition plastic material, which has been forced outwardly from the mold may interfere with the operation of the apparatus during sealing and/or subsequent container formation or may accumulate and adhere to the containers themselves. Accordingly, a primary object of this invention is to provide a generally new or improved and more satisfactory apparatus for forming molded articles.

Another object is the provision of an improved apparatus in which a flowable film-forming material is molded into the form of a container, filled with a material which is to be packaged and then sealed without contaminating the packaged contents.

Still another object is to provide an improved apparatus for molding, filling and sealing containers, the walls of which are generally smooth and of uniform wall thickness.

A still further object is the provision of a molding apparatus having means for automatically ejecting the molded articles therefrom.

Still further objects will appear from the following description.

In general, the above objects are accomplished in accordance with the present invention by an apparatus which includes a pair of vertically aligned mold sections which together define a mold cavity of desired shape and which are mounted for relative movement to facilitate rapid ejection of the molded articles. A tube of flowable or plastic film-forming material having a closed end is delivered downwardly into the cavity formed by the mold section through an opening in the uppermost mold section where it is expanded into the shape of a container. This opening is slightly larger than the cross section of the delivered tube of film-forming material so as to permit smooth and uniform travel of the tube therethrough. Prior to and during the expansion of the tube of film-forming material, the opening in the uppermost mold section is partially closed by a set of retainer blades which engage with the periphery of the delivered tube of film-forming material so as to prevent the film-forming material from flowing upwardly therethrough.

Once molded and filled, the container is simultaneously sealed and severed from the unexpanded portion of the tube of film-forming material by a set of cutting blades which are moved over the opening in the uppermost mold section. More specifically, the retainer and cutting blades are all mounted for movement along a plane which extends substantially perpendicular to the axis of the opening in the uppermost mold section and are disposed in alternate relationship with each other. These respective sets of blades are moved in sequence such that the cutting blades are projected across the mold opening after the retainer blades have performed their intended function and have been retracted.

The retainer blades are shaped at their leading ends so that in their projected positions they together conform substantially with the cross-section of the tube of film-forming material which is initially delivered into the mold cavity. On the other hand, the cutting blades are each provided with a pointed leading end and together cooperate to completely close the opening leading into the mold cavity. In addition to sealing and severing the formed and filled container from the unexpanded tube of film-forming material, the cutting blades serve also to close-off the severed end of such unexpanded tube of film-forming material and thus prepare the same for a subsequent molding operation.

As heretofore noted, the retainer blades prevent the film-forming material from flowing upwardly through the opening in the uppermost mold section during expansion of that portion of the tube of film-forming material which is within the mold cavity. Thus, the finished container is of generally uniform wall thickness and there are no undesired accumulations of plastic material either along the area at which the container is sealed or within the molding apparatus itself. The cutting blades, being movable in the same plane as the retainer blades, serve to grip or collapse the tube of film-forming material and, in effect, urge the film-forming material over and at least partially into the opening in the uppermost mold section to thereby provide a strong, smooth, uniform and thus reliable seal.

Ejection of the molded container after sealing is facilitated by having the lowermost mold section mounted on a carriage which may be retracted away from the other of the mold sections. Preferably, the movable mold section is in the form of a tubular member having an end wall formed by an ejector block. The ejector block is normally maintained at one end of the tubular member by gravity during the actual molding operation and is moved upwardly relative to the tubular member to eject the molded container as the carriage is retracted and urged against a fixed support. This movement of the ejector block is facilitated by one or more rigid rods which extend through and are slidable relative to the carriage and are connected to a plate located between the carriage and support. With this arrangement, the movement of the plate is arrested by the fixed support before the carriage is completely retracted and while it continues its retracting movement. As a result, the ejector block is moved upwardly relative to the annular member of the lowermost mold section to eject the molded container therefrom. To insure that the molded container remains within the lowermost mold section as it is retracted, the inner wall of such section may be tapered slightly away from its open end so that the molded container is retained therein by a slight wedging action.

Expansion of the plastic film-forming material may be achieved by means of air or other gas which is nonreactive with the particular film-forming material employed, or by means of a vacuum applied through the walls of the mold and preferably by a flowable material which is being packaged, or by a combination of these procedures. If desired, the expanding or inflating medium may be in a heated condition when delivered into the gob of film-forming material to prevent premature setting thereof.

The container of the present invention may be made from a wide variety of materials which may be rendered plastic or in a flowable condition. Preferred types include the synthetic linear polymers of thermoplastic character and the elastomeric types. Examples include vinyl resins, such as polyvinyl acetate, copolymers of vinyl chloride and vinyl acetate, copolymers of acrylonitrile and vinyl acetate, polyacrylonitrile and copolymers of acrylonitrile with vinyl chloride, vinyl acetate, methacrylonitrile, and so forth, polyethylene, linear superpolymers of the polyester of nylon (polyamide) type, polyvinyl butyral, polyvinyl alcohols, polyvinyl ethers; elastomeric types may include neoprene, polymers of chloroprene, copolymers of butadiene with styrene or acrylonitrile, polyisobutylene, and so forth. It is to be understood that the mentioning of these particular materials is not intended to limit the invention thereto but merely to illustrate the wide variety of film-forming materials that can be used in carrying out the invention. Of course, the selection of any particular material depends upon the character of the material which is to be packaged in the finished container. Thus, polyvinyl acetate, polyvinyl acetals and polyvinyl alcohols and neoprene, especially the latter two types, are highly advantageous when packaging oils, especially of the hydrocarbon type. Polyvinyl acetate, polyvinyl chloride, related copolymers of these two monomers, and polyethylene are, on the other hand, particularly adapted for packaging of aqueous liquids.

The film-forming material may be converted into a flowable mass or gob by fushion or by the incorporation of plasticizers or solvents capable of dissolving or dispersing the material. Thus, any of the thermoplastic materials may be heated to fusion after which the expanding or inflating medium may be introduced into a tubular mass thereof, preferably at the same temperature as the fused material. If necessary, the temperature of fusion may be lowered by the incorporation of a plasticizer either of solid or liquid character. When plasticizers or solvents are incorporated into the plastic material to form the gob, the plasticizer or solvent is preferably non-reactive with the expanding medium. The cooling of the fused plastic mass, with or without plasticizers, is effected as the expanded envelope strikes the walls of the mold where it is set into a desired shape. Volatile solvents may be employed for dissolving or dispersing the film-forming material so that the gob may be formed at room temperature and expanded, with the setting or coagulation of the expanded envelope occurring by volatilization of the solvent after expansion thereof against the mold walls. Known solvents and plasticizers may be employed, the selection depending upon the particular film-forming material to be used. Thus, acetone or dioxane may be used for vinyl acetate or copolymers of vinyl acetate or vinyl chloride or acrylonitrile. The concentration of the film-forming material, when a solution thereof is used, is preferably as great as possible and is limited only by the necessity that the plastic mass be capable of expanding under the pressure of the expanding medium, yet be of a reasonably viscous coherent plastic character which is capable of supporting its own weight.

In the drawing,

FIGURE 3 is a perspective view illustrating a portion of an article ejection means incorporated into the apapatus shown in FIGURE 1;

Figure 1:
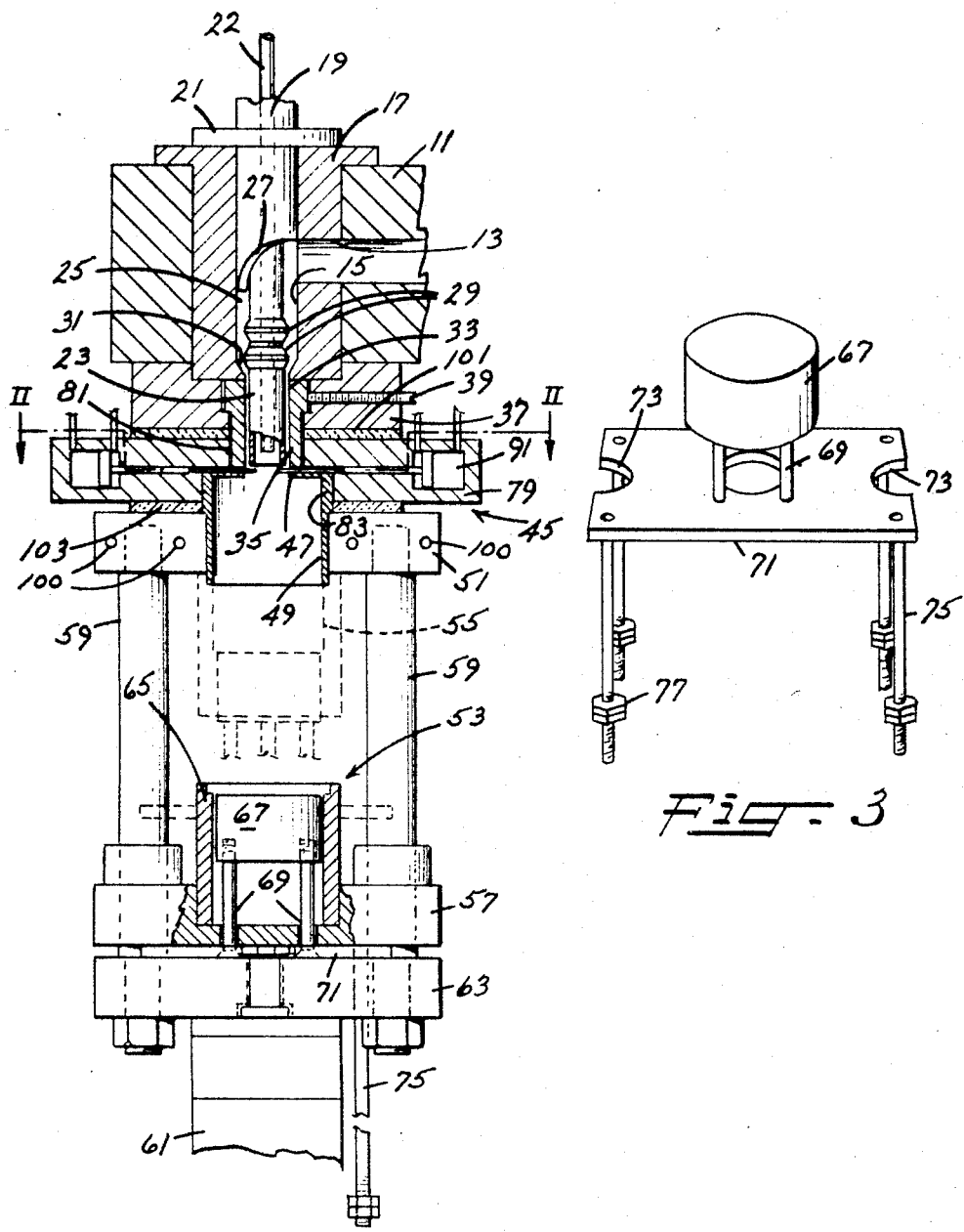
FIGURE 1 is a vertical section taken through the molding apparatus of the present invention.

With reference to FIGURE 1 of the drawing, the apparatus of the present invention includes a conventional extruder having a feed cylinder 11 which delivers a flowable or molten plastic film-forming material through an aligned opening 13 and into a central passage 15 of a feed block 17. A pipe 19 extends into and through the central passage 15 of the feed block 17 and is supported therein by a collar 21. A thermally insulated liquid delivery or filling tube 22 is positioned within the pipe 19 and adapted to be selectively projected and retracted relative to the lower end of the pipe 19 by suitable means, not shown. The pipe 19 has a reduced diameter portion 23 which cooperates with the feed block passage 15 to provide an annular chamber 25. Preferably, the pipe 19 is formed with an arcuate surface 27 adjacent to the feed block opening 13 to gradually direct the flowable film-forming material downwardly into the chamber 25 as it issues from the opening 13. If necessary, the pipe 19 may be formed with one or more annular projections 29 to assist in minimizing flow differences and thus impart a more uniform and generally vertical flow to the film-forming material.

The lower end of the feed block passage 15 is of reduced diameter as shown at 31 and serves to channel the flow of film-forming material into an annular orifice 33 formed by the lower end of the pipe 19 and a surrounding nozzle 35. A nozzle plate 37 supports the nozzle 35 and is provided with a plurality of adjustable screws 39 which facilitate movement of the nozzle 35 relative to the lowermost end of the pipe 19.

The flowable film-forming material issues from the orifice 33 as a tube 41 which is closed at the one end 43 by a retainer and sealing blade assembly 45 which is described hereafter in detail. The tube 41 passes through an opening 47 in an upper mold section 49 which is held in fixed position by a support 51. This mold section 49 cooperates with a lower mold section 53 to provide a mold cavity 55 of desired shape, as illustrated by broken lines in FIGURE 1.

The mold section 53 is fixed to a carriage 57 which is movable along rods 59 by a conventional lift mechanism 61. In its fully retracted position the carriage rests on a fixed support 63. The mold section 53 includes a tubular member 65, one end of which is closed by an ejector block 67. One or more rigid rods 69 pass through the carriage 57 and are each connected at one end to the bottom of the block 67 and at their opposite ends to a spider 71 which is located between the carriage 57 and the fixed support 61. The spider 71 will, of course, move with the carriage 57 and, as shown in FIGURE 3, is shaped with arcuate bearing surfaces 73 which ride along the guide rods 59.

When the carriage 57 is elevated to project the mold section 53 into its broken line position as shown in FIGURE 1, the block 67 normally moves to the lower end of the tubular member 65 under the force of gravity. However, more positive movement of the block 67 is preferred and is achieved by tension rods 75 which are fixed to the spider 71 and extend through the fixed support 61. Nuts 77 are threadedly adjustable along the rods 75 so as to abut against the bottom surface of the fixed support 61 as the carriage 57 assumes its uppermost position.

Figure 2:
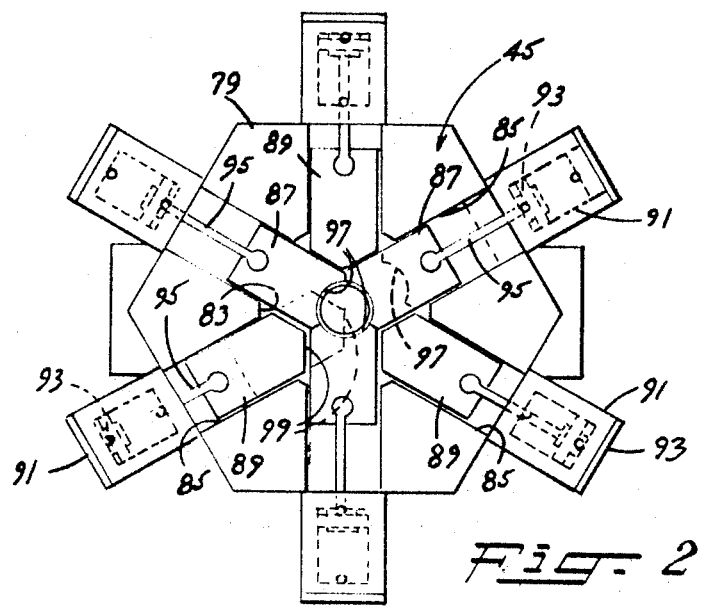
FIGURE 2 is a section taken substantially along the line II—II of FIGURE 1.

Referring to FIGURES 1 and 2, the retainer and sealing blade assembly 45 includes a housing 79 having a central passage 81 which receives the lower portion of the nozzle 35 and an opening 83 within which the upper mold section 49 is fixed. The housing 79 is formed with a plurality of slots 85 which extend radially of the housing opening 83 and in a plane generally parallel to the top surface of the mold section 49.

Retainer blades 87 and cutting blades 89 are disposed in alternate relationship in the slots 85 and are reciprocated in sequence, with one set of retainer and cutting blades being simultaneously projected over the opening in the upper mold section after the blades of the other of such set of blades have performed their intended function and have been retraced in unison. Movement of the retainer and cutting blades relative to their respective slots is achieved by individual hydraulic means, each of which includes a cylinder 91 and a piston 93 which is slidably mounted within the cylinder 91 and is connected to one of the blades by a rod 95.

As shown in FIGURE 2, the leading edges of the retainer blades 87 are shaped with an arcuate surface 97 which conforms with a portion of the outside surface or periphery of the extruded tube 41 of the film-forming material. The cutting blades 89, on the other hand, are each pointed and chamfered at their leading edges 99 and, when projected over the opening 47 in the upper mold section openings 49, together cooperate to collapse the portion of the tube 41 with which they engage and completely close the mold opening 47. To minimize expansion and perhaps binding of the retainer and cutting blades within their respective slots and to assist in rapidly cooling the formed container, at least the upper mold section 49 is formed of a thermally insulating material, as for example tetrafluoroethylene or epoxy resin, and cooling liquid is circulated through channels 100 formed in the support 51. In addition, it is preferred that the assembly 45 be insulated from the heated extrusion and related apparatus, which is located thereabove, as well as from the upper mold section 49 as shown at 101 and 103 in FIGURE 1.

At the start of a container molding cycle the carriage 57 is in its elevated or projected position so that the mold sections 49 and 53 together define the mold cavity 55. In addition, both the retainer blades 87 and the cutting blades 89 are in their fully retracted positions so that the opening 47 in the upper mold section 49 is completely exposed.

Molten film-forming material is then delivered through the cylinder 11 and into the chamber 15 from which it is extruded through the orifice 33 as a tube 41. This tube must be closed at its leading end for proper container formation so that the retainer and cutting blades are actuated without going through any expansion or filling cycles. The portion of the tube of film-forming material which is severed during the cutting operation can be manually removed from the mold cavity after which the parts are again positioned as described above. It will be apparent that this initial closing of the tube 41 of film-forming material is performed only at the start of operations since the sealing and severing of each molded container also results in closing-off the newly formed leading end of the tube 41 of film-forming material issuing from the orifice 33.

Figure 4:
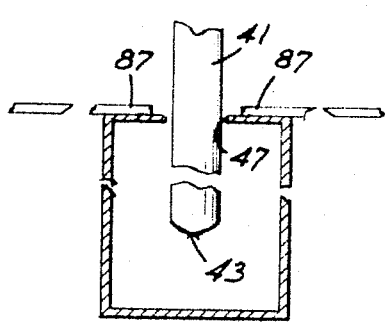
FIGURE 4 is a diagrammatic view illustrating an initial step of the molding operation as practiced by the apparatus of the present invention.

This tube 41 of film-forming material, which is now closed at 43, passes through the mold opening 47 and into the mold cavity 55, as shown in FIGURE 4. After a necessary length of this tube 41 is within the mold cavity 55, the retainer blades 87 are hydraulically projected to engage their arcuately shaped leading edges with the periphery of such tube 41, as shown by solid lines in FIGURE 2. In this position, and as illustrated in FIGURE 5, the retainer blades cover the portion of the mold opening 47 which is not occupied by the tube 41 of film-forming material.

Figure 5:
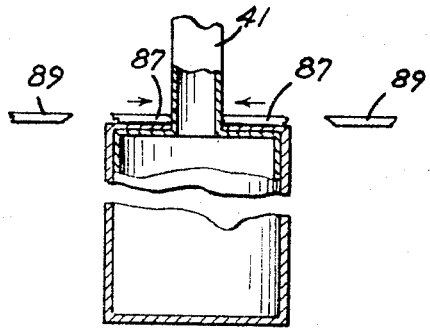
FIGURE 5 is a view similar to FIGURE 4 showing the relationship of the parts during container molding.

The tube 22 is then lowered into the tube 41 and the material to be packaged is then delivered as a liquid under pressure to thereby expand the portion thereof which is within the mold cavity, as shown in FIGURE 5. The liquid which is being packaged is preferably cooled to assist in setting the container as it is expanded and, as heretofore noted, the tube 22 is thermally insulated to avoid chilling of the pipe 19 or the plastic material surrounding the same. The tube 22 and retainer blades 87 are retracted and the cutting blades 89 are hydraulically projected over the mold opering into a position as shown by broken lines in FIGURE 2 of one of the blades 89.

Figure 6:
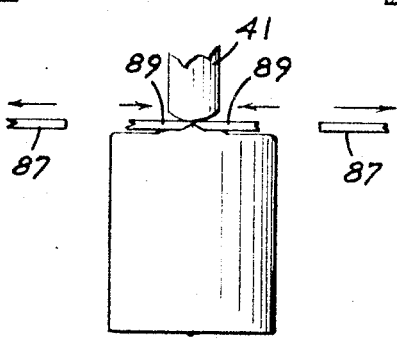
FIGURE 6 is a view similar to FIGURES 4 and 5 illustrating the relationship of the parts during sealing of a formed and filled molded container.

As the cutting blades 89 move over the opening 47 in the mold section 49, they engage with the unexpanded portion of the tube 41 which is directly adjacent to the mold opening 47 and collapse and ultimately sever the same, as illustrated in FIGURE 6. During this operation, the cutting blades 89 urge the tube 41 over the mold opening where it is sealed. The chamfer along the leading edges of the blades 89 minimizes thinning of the film-forming material at the area of sealing. It will be noted that the top wall of the upper mold section 49 is made as thin as possible to minimize any projection along the molded container at the area of sealing. Further, it will be apparent that as the molded container is sealed the newly formed leading end of the molded container is closed-off and ready for a subsequent molding operation.

The carriage 57 is now retracted carrying with it the lower mold section 53 and the molded container. The spider 71 will, of course, engage with the fixed support 63 before the carriage 57 is fully retracted and will cause the ejector block 67 to urge the molded container upwardly from the annular member 65 as the carriage 57 and annular member 65 continue to retract toward the fixed support 63.

It is to be understood that changes and variations may be made without departing from the spirit and scope of the invention as defined in the appended claims.

We claim:

1. Apparatus for forming hollow closed articles including a pair of mold sections having walls which together define a mold cavity, an opening through a wall of one of said mold sections, means outside of said mold sections for delivering a tube of flowable film-forming material having a closed end through said opening and into the mold cavity, means movable into engagement with the outside periphery of the tube of film-forming material after it has been delivered into the mold cavity for closing the portion of said opening outside of the delivered tube of flowable film-forming material, means for delivering a fluid into the tube of film-forming material to expand the portion thereof within the mold cavity against the walls of said mold sections and said movable means, and means for collapsing and severing the tube of film-forming material adjacent to said opening and said movable means whereby the tube is provided with a closed end and the expanded portion thereof is sealed.

2. Apparatus as defined in claim 1 wherein said movable means includes a plurality of retainer blades and means for moving said retainer blades to and from positions partially over said opening, said retainer blades being shaped along their leading ends to engage with the periphery of the tube of film-forming material to thereby confine expansion to the portion thereof which is within the mold cavity.

3. Apparatus as defined in claim 1 wherein said means for collapsing and severing the tube of film-forming material includes a plurality of cutting blades and means for moving said cutting blades to positions over said opening.

4. Apparatus as defined in claim 2 wherein said means for collapsing and severing the tube of film-forming material includes a plurality of cutting blades and means for moving said cutting blades over said opening.

5. Apparatus as defined in claim 4 wherein said retainer and cutting blades are all mounted for movement along a plane substantially perpendicular to the axis of said opening and are disposed in alternate relationship with each other, and wherein said means for moving said retainer and cutting blades are operative in sequence to move the respective retainer and cutting blades in unison toward and away from the axis of said opening.

6. Apparatus as defined in claim 5 wherein said cutting blades are pointed and chamfered at their leading ends and together close said opening when moved thereover.

7. Apparatus as defined in claim 1 further including means for moving said other mold section toward said one mold section into a position in which said sections together define a mold cavity and into a retracted position in which said mold sections are separated from each other, said other mold section including a tubular member and a block forming an end wall thereof, and means for moving said block axially of said tubular member as said other mold section is moved toward a retracted position to eject a molded article therefrom.

8. Apparatus as defined in claim 7 wherein said means for moving said other mold section includes a carriage and further including means for supporting said carriage in a retracted position, and wherein said means for moving said block axially of said tubular member includes a plate positioned between said carriage and carriage supporting means and at least one rod extending slidably through said carriage fixed at its ends to said block and said plate.

References Cited
UNITED STATES PATENTS

| | | | |
|---|---|---|---|
| 1,134,763 | 4/1915 | Schaub | 83—628 |
| 1,981,059 | 11/1934 | Matthews et al. | 83—628 |
| 3,296,345 | 1/1967 | Dietz. | |
| 3,311,949 | 4/1967 | Moran | 18—5 |

WILBUR L. McBAY, Primary Examiner

U.S. Cl. X.R.

53—140